United States Patent [19]

Glorioso

[11] 4,132,879

[45] Jan. 2, 1979

[54] ARC TIME INDICATING APPARATUS FOR STUD WELDING UTILIZING A CAPACITIVE POWER SOURCE

[75] Inventor: Paul A. Glorioso, Amherst, Ohio

[73] Assignee: TRW Inc., Cleveland, Ohio

[21] Appl. No.: 727,059

[22] Filed: Sep. 27, 1976

[51] Int. Cl.$^2$ .......................... B23K 9/10; B23K 9/20
[52] U.S. Cl. ................................... 219/98; 219/130.01
[58] Field of Search .......... 219/98, 99, 131 R, 130.01; 324/181, 186

[56] References Cited

U.S. PATENT DOCUMENTS

| | | | |
|---|---|---|---|
| 3,543,156 | 11/1970 | Hall et al. | 324/181 |
| 3,764,911 | 10/1973 | East | 324/186 |
| 3,854,472 | 12/1974 | Giroi et al. | 324/186 |
| 3,932,724 | 1/1976 | Raycher | 219/98 |

FOREIGN PATENT DOCUMENTS 332961  7/1972  U.S.S.R. ................ 219/131 R

Primary Examiner—Elliot A. Goldberg
Assistant Examiner—Clifford C. Shaw
Attorney, Agent, or Firm—Allen D. Gutchess, Jr.

[57] ABSTRACT

Apparatus is provided for measuring and indicating the length of time a welding arc exists in a stud welding cycle utilizing a capacitive power source. Heretofore, the arc time of stud welding apparatus employing capacitors for the power source has only been measured in the laboratory with an oscilloscope. The new indicating and measuring apparatus for the arc time is usable with conventional stud welding, contact stud welding, and gap stud welding employing capacitive power sources. The apparatus produces a number on a visual indicator in the form of a meter or a digital read-out device and the operator can note the number when the ultimate weld is produced. The operator can then subsequently adjust the equipment to repeat that number on the indicator to always be assured of optimum weld quality without the necessity of repeating a number of test welds.

6 Claims, 3 Drawing Figures

ARC TIME INDICATING APPARATUS FOR STUD WELDING UTILIZING A CAPACITIVE POWER SOURCE

This invention relates to apparatus for measuring and indicating the time that a welding arc exists in a welding cycle of stud welding equipment employing a capacitive power source.

Heretofore, the length of time the welding arc existed in a welding cycle where a bank of capacitors were employed as the power source was only measurable under laboratory conditions with the use of oscilloscopes. In the field, it was necessary for the operator to make a number of test welds under different adjustments or settings until the ultimate weld was achieved, with the actual welds then being made under those settings. However, with different sizes of studs and other variables, it was necessary to repeat a number of test welds until the ultimate weld was achieved each time the stud size was changed or when variations in the conditions occurred.

With the arc time indicating apparatus according to the invention, a number representing the length of time the welding arc exists in a welding cycle is indicated on a visual indicator each time a weld is made. When the ultimate weld is made, the operator simply notes the number on the indicator and then subsequently sets the equipment to read that number when similar studs are to be subsequently welded. Thus with different studs, the operator can know what number to set for the equipment without making a number of experimental test welds each time to achieve the proper settings for the welding cycle.

Apparatus according to the invention can be used with conventional drawn-arc stud welding equipment; capacitor discharge, gap stud welding equipment; and capacitor discharge, contact stud welding equipment.

In a specific form, the arc time indicating apparatus according to the invention includes a light-emitting diode connected across the stud and workpiece and arranged to cause a photo silicon-controlled rectifier to turn on which then conducts while the arc exists or persists. A capacitor charges while the SCR conducts and the voltage on the capacitor is thus indicative of the arc time. In place of the volt meter, a digital read-out counter can be operated while the SCR conducts with the number thereon thus indicative again of the main welding arc time.

It is, therefore, a principal object of the invention to provide apparatus for indicating the arc time of a welding cycle utilizing a capacitive power source.

Another object of the invention is to provide means for measuring the arc time of conventional welding cycles, capacitor-discharge, contact welding cycles, and capacitor-discharge, gap welding cycles.

A further object of the invention is to provide relative low-cost means for measuring and indicating the arc time in welding cycles utilizing capacitive power sources.

Many other objects and advantages of the invention will be apparent from the following detailed description of preferred embodiments thereof, reference being made to the accompanying drawings in which.

The arc time indicating apparatus is useful with conventional drawn-arc stud welding equipment using a capacitive power source. With this type of welding, a stud to be welded is first placed with an end in contact with the workpiece. The stud is then retracted from the workpiece and held in a retracted position. The power source and controls impose a voltage between the stud and the workpiece as the stud is retracted to form a pilot arc. Subsequently, a higher current is imposed on the pilot arc to establish a main welding arc between the stud and the workpiece and the stud is plunged back toward and against the workpiece. The main welding arc melts a portion of the end of the stud and of the workpiece with the molten portions then joining and solidifying as the stud engages the workpiece, to provide a secure weld between. With the capacitive power source, the main welding arc can exist as long as about eight milliseconds but a short circuit usually occurs prior to that time when the stud contacts the workpiece. By adjusting the time at which the plunge stroke begins relative to the initiation of the main welding arc, or by changing the length of the plunge stroke, the time at which the stud contacts the workpiece and the time of the welding arc can thereby be controlled. For example, the optimum main welding arc may be within a range of four to five milliseconds. In that instance, the initiation of the welding arc and the plunge stroke of the stud can be controlled so that the stud contacts the workpiece and shorts out the main welding arc about four and one-half milliseconds after it is initiated.

The weld arc indicating apparatus can also be employed with capacitor-discharge stud welding of the contact type and also of the gap type. In the contact type of stud welding, a stud having a preformed tip of predetermined size and shape is placed with the tip in contact with the workpiece. When a bank of capacitors as the power source is discharged through the stud and the workpiece, the tip is flashed away, a welding arc is initiated, and the stud forced into contact with the workpiece by means of spring pressure or weights. With the gap type of stud welding, a similar tipped stud is employed but the stud is held spaced from the workpiece and the stud is subsequently plunged toward the workpiece with the capacitive power source connected thereacross. As the stud approaches the workpiece, the tip again is flashed away, an arc is initiated, and the stud plunged against the workpiece to complete the weld. In both of these types of stud welding, the duration of the arc can be controlled by the amount of spring pressure or the amount of weight employed. With the gap type, the arc time or duration can also be controlled by the distance initially maintained between the stud and the workpiece.

Figure 1:
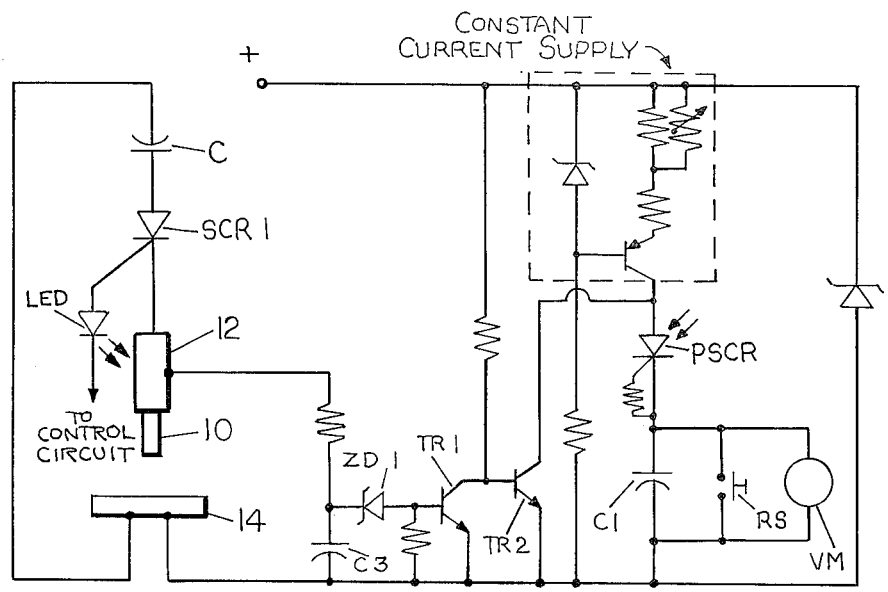
FIG. 1 is a circuit diagram of circuitry and components for indicating the arc time of welding apparatus employing a conventional welding cycle.

Referring to the drawings, the apparatus of FIG. 1 for indicating the main welding arc time is particularly designed for conventional drawn-arc stud welding. The welding circuit and equipment is well known in the art and only portions pertinent to the instant circuit and components are depicted. These include a chuck 10 and a stud 12 along with a workpiece 14. A capacitor C is representative of a bank of capacitors used as the power source. The capacitor is connected to the workpiece 14 and to the chuck 12 through a switch in the form of a silicon-controlled rectifier designated SCR 1. When the gate of this SCR renders it conducting, then the capacitor is discharged across the stud and workpiece to form the main welding arc.

The main welding arc exists up to eight milliseconds in a typical case but the plunge of the stud toward and against the workpiece usually occurs prior to the expiration of that time. When the stud contacts the workpiece and shorts out the capacitor, the welding arc is terminated, with this arc usually existing for a period of four to five milliseconds to produce the ultimate weld. However, the period of time to achieve the best weld quality depends on the stud size and other variables. For the same stud size and similar conditions at a later time, if the operator knows the best time for the welding arc, he can set the welding equipment to achieve that time and ultimate welds will be obtained without the necessity of conducting a plurality of welding tests under different arc times to achieve the ultimate weld.

The duration of the main welding arc can be controlled by adjusting the time the main welding arc is initiated relative to the initiation of the plunge stroke of the stud toward the workpiece, or these times can be kept the same and the length of the plunge stroke of the stud can be adjusted to control the welding arc time. Typically, the plunge stroke of a small stud is one-sixteenth inch and this can be increased to lengthen the welding arc time or decreased to shorten it.

To measure and indicate the time of the welding arc, means are provided to be energized when the main welding arc silicon-controlled rectifier SCR 1 is rendered conducting. In this instance, a light-emitting diode designated LED is placed in series with the gate of SCR 1 and is energized when SCR 1 conducts. This diode LED then causes a photo silicon-controlled rectifier designated PSCR to conduct which then connects a constant current supply, designated such in dotted lines, with a capacitor C1 and causes this capacitor to charge as long as the rectifier PSCR conducts. The length of time the rectifier PSCR conducts depends upon the arc time and the charge on the capacitor C1, in turn, depends on the length of time that the PSCR conducts. Consequently, when the voltage of the capacitor C1 is read on a volt meter VM, which constitutes an arc time indicating device, the magnitude of that voltage is directly related to the magnitude of the main welding arc time. Hence, when the operator notes the voltage on the volt meter when the ultimate weld is achieved, he can subsequently set up the equipment to obtain that same reading and, hence, continue to repeat the same ultimate welds.

It is desirable to render the PSCR non-conducting immediately prior to the termination of the welding arc in a dead short when the stud contacts the workpiece. Hence, when the voltage across the stud and the workpiece drops to a low value, such as five volts, the rectifier PSCR is rendered non-conducting and the charging of the capacitor C1 stops. To achieve this, a Zener diode ZD1 and two amplifying and flip-flop transistors TR1 and TR2 are employed. These shunt the current around the rectifier PSCR when the voltage on the Zener diodes ZD1 is less than five volts. At that point, the second transistor TR2 turns on to provide the shunt across the rectifier PSCR.

After the reading on the meter VM is noted when the welding cycle is completed, a reset switch RS is manually closed to reset the capacitor C1.

Figure 2:
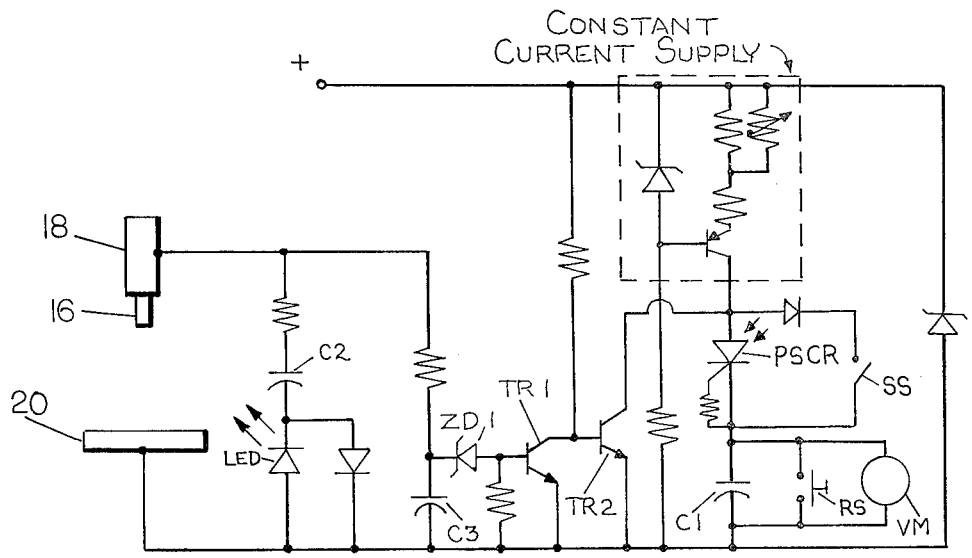
FIG. 2 is a circuit diagram of modified circuitry and components for indicating arc time for capacitor discharge gap welding.

The circuit of FIG. 2 is primarily designed for capacitor-discharge welding and specifically for the gap and contact types. With a switch SS closed, the circuit is used for contact welding and with it open, the circuit is suitable for gap welding. In that instance, when a stud 16 held by a chuck 18 is away from a workpiece 20, a capacitor C2 is charged, the charging beginning when the trigger of the welding apparatus is closed, with the charge being completed before the stud contacts the workpiece. When the stud does contact the workpiece when moved thereagainst by weights or under spring pressure, the capacitor C2 then discharges through the light-emitting diode LED and turns on the photo silicon-controlled rectifier PSCR, as before.

When the capacitor C2 discharges and the voltage drops to zero, a charge is still applied to a Zener diode ZD1 by a capacitor C3. When the voltage between the stud 16 and the workpiece 20 drops below a predetermined value such as five volts, the charge on the capacitor C3 also drops below five volts and the flip-flop transistors TR1 and TR2 again function to shunt the rectifier PSCR as before. The value on the volt meter VM can be read as before and the capacitor C1 can be reset by the switch RS.

With contact stud welding and with the selector switch SS closed, the stud tip is in contact with the workpiece. When the trigger is pulled, the arc starts when the tip is vaporized. At this time, the capacitor C3 charges and applies a charge to the Zener diode ZD1, turning on transistor TR1 and off transistor TR2, enabling the capacitor C1 to charge through the closed switch SS. When the voltage drops below the predetermined value, the charge on the capacitor C3 similarly drops and the flip-flop transistors switch again to shunt the capacitor C1. The value on the volt meter VM can then be read and the capacitor C1 reset by the switch RS.

Figure 3:
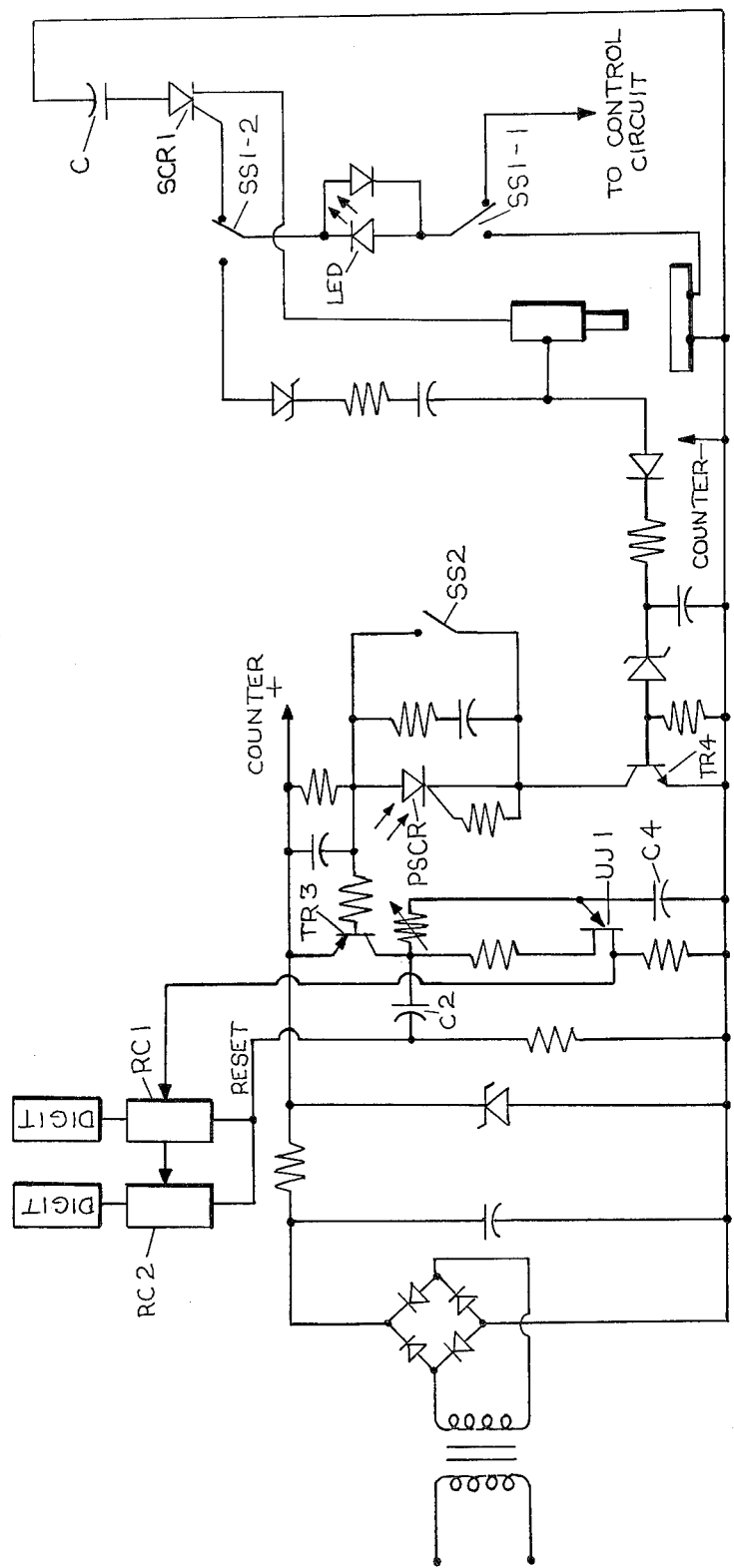
FIG. 3 is a circuit diagram of modified circuitry and components for measuring and indicating arc time for several types of welding.

The circuit of FIG. 3 is designed for the capacitor-discharge, drawn-arc stud welding, and for gap and contact type, too. In this instance, the volt meter is replaced by a visual read-out counter and specifically one having two digits which is sufficient to indicate arc time between 0.1 and 9.9 milliseconds. As in FIG. 1, voltage for the gate of the main welding arc rectifier SCR 1 through the light-emitting diode LED activates the photo rectifier PSCR. The rectifier PSCR turns on a transistor TR3 through a transistor TR4 which produces a pulse to a capacitor C2 to reset commercially-available read-out counters designated RC1 and RC2. A unijunction transistor UJ1 then is caused to oscillate at a given rate, such as 0.1 milliseconds, through a capacitor C4 which charges until the unijunction transistor fires. Each pulse of the transistor UJ1 causes the counter RC1 to advance one digit with the counter RC2 advancing every ten digits, with the digits being displayed on the counters.

When the voltage between the stud and the workpiece again drops to a predetermined value, such as five volts, the transistor TR4 turns off and the rectifier PSCR along with the transistor TR3 turn off with the pulsing by the unijunction transistor UJ1 then stopping.

The circuit of FIG. 3 can be employed for capacitor discharge gap stud welding by closing selector switch contacts designated SS1-1 and SS1-2. For capacitor discharge contact stud welding, a selector switch SS2 is also closed.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. Apparatus for welding a stud to a workpiece by drawn-arc stud welding, contact stud welding, or gap stud welding utilizing capacitive power sources, said apparatus comprising means for holding the stud, capacitor means for supplying welding arc current to said stud holding means, means for producing a visual indication, the value of which is related to the length of time said visual indicating means operates, means for operating said visual indicating means, solid state switch means for initiating operation of said operating means, means for terminating operation of said operating means when a predetermined voltage still exists between the stud and the workpiece, selector switch means for by-passing said solid state switch means, means for causing said solid state switch means to conduct when the welding arc is initiated, second solid state switch means connected in series with said capacitor means and said stud holding means, and additional selector switch means having a first position for placing said causing means in series with the gate of said second solid state switch means, said additional selector switch means having a second position for placing said causing means in series with said stud holding means and said workpiece.

2. Apparatus according to claim 1 characterized by said visual indicating means comprising a read-out counter, and said operating means comprising means for advancing the digits of said counter.

3. Apparatus according to claim 2 characterized by said advancing means comprising a unijunction transistor, and said solid state switch means comprising a photo silicon-controlled rectifier for controlling the length of operation of said unijunction transistor.

4. Apparatus for welding a stud to a workpiece comprising means for holding the stud, capacitor means for supplying welding arc current to said holding means, means for producing a visual indication, the value of which is related to the length of time said visual indicating means operates, means for operating said visual indicating means, solid state switch means for initiating operation of said operating means, means for terminating operation of said operating means when a small predetermined voltage still exists between the stud and the workpiece and before the stud contacts the workpiece at the end of the plunge stroke of the stud, the value shown by said visual indicating means being directly related to the length of time said visual indicating means is actuated and to the length of time the welding arc exists between the stud and the workpiece, means for causing said solid state switch means to conduct when the welding arc is initiated, second solid state switch means connected in series with said capacitor means and said stud welding means, and selector switch means having a first position for placing said causing means in series with the gate of said second solid state switch means, said selector switch means having a second position for placing said causing means in series with said stud holding means and said workpiece.

5. Apparatus according to claim 4 characterized by said visual indicating means comprising a read-out counter and means for advancing the digits of said counter.

6. Apparatus according to claim 5 characterized by said advancing means comprising a unijunction transistor and a photo silicon-controlled rectifier for controlling the length of operation of said unijunction transistor.

* * * * *